Oct. 23, 1956

J. A. BARTELINK 2,767,582

ELECTRONIC FLOWMETER

Filed Nov. 7, 1952

INVENTOR
JAN ANTOON BARTELINK,

BY Robert B Pearson

ATTORNEY

Oct. 23, 1956

J. A. BARTELINK 2,767,582

ELECTRONIC FLOWMETER

Filed Nov. 7, 1952

INVENTOR
JAN ANTOON BARTELINK,

BY Robert B Pearson

ATTORNEY

United States Patent Office 2,767,582
Patented Oct. 23, 1956

2,767,582

ELECTRONIC FLOWMETER

Jan Antoon Bartelink, Amsterdam, Netherlands, assignor to Nationaal Luchtvaartlabaratorium, Amsterdam, Netherlands Application November 7, 1952, Serial No. 319,363

Claims priority, application Netherlands October 30, 1952

2 Claims. (Cl. 73—231)

The invention relates to an electronic frequency meter which may be used to advantage with a fluid metering device as e. g. described in my copending U. S. A. patent application No. 318,474 and U. S. A. Patent No. 2,728,893.

For this metering device a rotor placed in the fluid supply pipe is caused to rotate by the fluid flowing through and generates an alternating voltage in the stator belonging thereto, whose frequency is a function of the quantity of fluid flowing through the device per unit of time.

In the case of aircraft, for the determination of whose fuel consumption said device is intended in particular, however, it is customary to determine the weight of fuel consumed. In order to obtain this conversion of volume to weight, however, a correction is necessary which is determined mainly by the fuel temperature. Applying this correction thus makes it possible to register the weight of the fuel consumed direct on an indicating instrument which in actual fact registers the frequency of the generated alternating voltage, but which can be calibrated in units of weight per unit of time.

As an indicating instrument a D. C. current meter is used preferably of the moving coil type. If such a meter has a periodically changing current sent through it, whose frequency is high as compared with the frequency of the meter system, the meter will give a constant reading corresponding to a direct current representing the average value of the periodically changing current.

The invention is based on the principle that from the alternating voltage supplied by the fluid metering device, whose frequency has to be determined a periodic current is derived consisting of discrete impulses, the pulse frequency being equal to the frequency that has to be measured, that is to say: each period of the input voltage causes one pulse to occur. At the same time this must be arranged in such a way that the time integral of the current pulses for one period of the current is constant and independent of the frequency to be measured, which means that the area of the pulses in the current-time diagram is constant and independent of the distance between two successive pulses. Provided this condition is satisfied the reading of a D. C. current meter will be proportional to the frequency of the current pulses supplied to said meter.

In existing frequency meters constant area current pulses are mostly generated by charging a capacitor via a charging circuit once per period of the input voltage and then discharging this capacitor via a discharging circuit, the indicating instrument then being connected in series with one of these chains. Charging and discharging can be effected by a system with electron tubes (electronic switch) controlled by the input voltage.

For obtaining constant area current pulses, the voltages to which the capacitor is charged or discharged must be constant, independently of the properties of the input voltage. The times available for charging and discharging are usually about equal to the times elapsing between two successive zero sequences of the input voltage, but with pulse type voltages one of these times is very short so that the time available for charging or discharging the capacitor may become insufficient, thus giving rise to errors in measurement.

To eliminate these and other drawbacks, the frequency meter according to the invention is designed in such a way that rectangular current pulses are generated whose amplitude (height) and length (duration) are determined by the circuit itself and are constant to a high degree, these pulses being introduced in such a way by the input voltage that each input voltage period gives rise to one pulse.

In the following detailed description of the invention reference will be had to the accompanying drawings representing an embodiment and in which:

Fig. 4 shows a food metering device applicable for use with the frequency meter.

Figure 1:
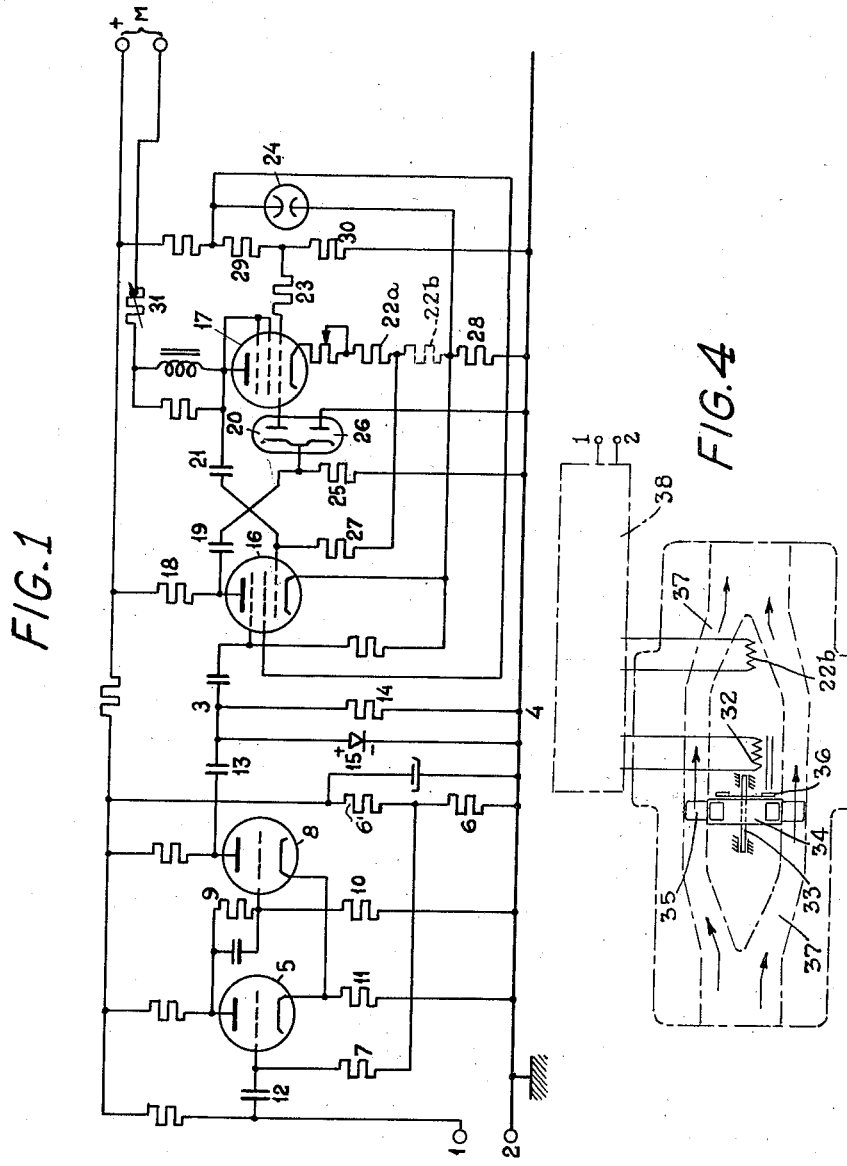
Fig. 1 is the circuit diagram.

Referring to Fig. 4, the flowmeter comprises a rotor 34, mounted on a shaft 33 and having vanes 35 positioned in passage 37 through which the fluid to be measured flows. A reactor rotation coil 32 is influenced by an element of ferromagnetic material 36, preferably consisting of a star-shaped armature as described in United States Co-Patent No. 2,728,893.

The temperature responsive resistance 22–B is shown in both Fig. 1 and Fig. 4. The temperature responsive resistance is located in close terminal contact with the fluid to be measured, and comprises a part of the cathode resistor of the tube in the electronic circuit as described below.

Numeral 38 refers to an amplifying unit also described in Co-Patent No. 2,728,293. Output terminals 1 and 2 correspond to input points 1 and 2 of Fig. 1.

The left-hand part of Fig. 1 shows the trigger pulse generator, 1 and 2 whereof are the input terminals and 3 and 4 the output terminals. This pulse generator is a cathode-coupled bi-stable multivibrator known per se and has the property that there exist two positive critical values for the control grid voltage of the tube 5, so that if said voltage increases beyond the upper critical value, or respectively decreases beyond the lower critical value, the circuit is triggered, i. e. is transferred from one stable condition into the other. The input voltage is applied to terminal 1 of said control grid via the condenser 12, said grid receiving a positive bias via resistor 7 from the voltage divider 6, 6', the value of which bias lies between said critical values. At output terminal 3 short negative voltage impulses are available for further use. Per period of the input voltage there occurs one negative voltage pulse. For values of control grid voltage of the tube 5 below the lower critical value, said tube is cut off and its plate voltage is equal to the plate supply voltage. In consequence of the presence of resistors 9 and 10 the grid of tube 8 has a certain positive voltage relatively to the lower end of the common cathode resistor 11, in such a way that tube 8 carries a certain plate current. As the cathode of tube 8 is positive relatively to the lower end of resistor 11 in consequence of the voltage drop caused across this resistor by the plate current of tube 8, the grid of this tube will be slightly negative relative to the cathode.

If the grid of tube 5 is made more positive, a small plate current will flow through the tube if the voltage exceeds the upper critical value. The plate voltage of tube 5 will fall accordingly and so will the grid voltage of tube 8, so that the plate current of 8 will decrease. The voltage drop across resistor 11 will become smaller and the cathode of tube 5 less positive, whereby the grid of this tube will become more positive relatively to the cathode, and the plate current of tube 5 will increase. This interaction of the two tubes has the result of bringing about a cumulative process whereby tube 8 is cut off and tube 5 carries a certain plate current. If the grid of tube 5 is subsequently made more negative, then at the crossing of the lower critical control grid voltage a second cumulative process will occur, whereby tube 5 is cut off and tube 8 will carry a certain plate current. The critical values of tube 5 are indicated by $Va$ and $Vb$ in Figure 2B. Thus, when the greater of these values is exceeded positively, tube 8 will be cut off and tube 5 becomes conductive. If the smaller value is exceeded negatively, tube 8 becomes conductive and tube 5 is cut off, these processes occurring very rapidly.

Figure 2:
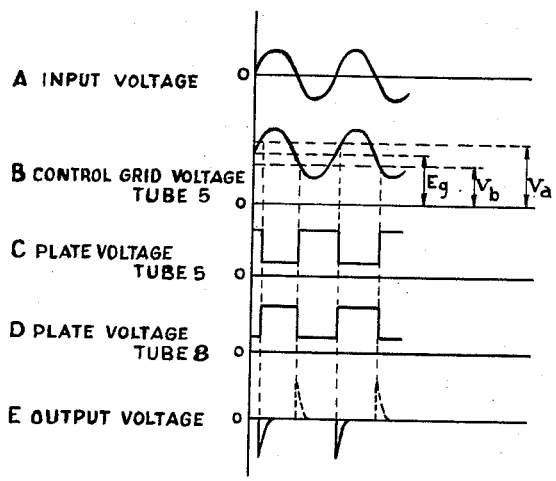
Fig. 2 shows the pulses occurring in the trigger pulse generator.

An alternating voltage supplied to the grid of tube 5 via capacitor 12, the amplitude whereof exceeds $Va-Vb$ will cause the circuit to change over periodically, whereby as a result of the plate current impulses of tube 5 a rectangular alternating voltage occurs at the plate of this tube (Fig. 2C), with a frequency equal to that of the input voltage (Fig. 2A).

A proper choice of circuit elements will allow the values of $Va$ and $Vb$ to lie close to each other so that a small input alternating voltage will cause the system to operate.

The rectangular output voltage of tube 8 (Fig. 2D) is fed to the chain consisting of capacitor 13 and resistor 14, which form a differentiating circuit transforming the rectangular pulses into the sharp pulses shown in Fig. 2E. As the positive pulses adversely affect the measuring circuit, a diode, for instance a crystal diode 15, is placed parallel to resistor 14. Thus only the negative impulses will be available at output terminal 3.

The sharp negative pulses shown in Fig. 2E are fed to the third grid of tube 16 forming part of a monostable multivibrator circuit. If this circuit is left to itself, a state of stable equilibrium will occur, in which tube 16 carries a certain plate current (the first and third grids having approximately the cathode potential). Tube 17 is however cut off because the control grid of this tube has such a negative bias that the tube does not carry any plate current. Because of the plate current of tube 16, there occurs across the plate resistor 18 of said tube such a voltage drop that the voltage at the plate of tube 16 is fairly low, while the plate voltage of tube 17 is the same as the full plate feed voltage. The very short negative voltage pulses (Fig. 2E) arriving at terminal 3 are fed to the third grid of tube 16, whereby the plate current of this tube is completely suppressed so that the plate voltage of this tube suddenly rises to the full value of the plate feed voltage. This happens very suddenly and during this brief interval the voltage of capacitor 19 cannot noticeably change so that there is the same positive voltage excursion at the control grid of tube 17 as at the anode of tube 16. (The influence of diode 20 will be discussed later.)

Tube 17 therefore opens and the plate current of this tube causes a rapid drop in the plate voltage transferred by capacitor 20 to the control grid of tube 16, making this grid highly negative, because of which tube 16 remains cut off even after the end of the short pulse on the third grid. The result therefore is that the circuit changes discontinuously from the stable state in which tube 16 carries current and tube 17 is cut off to the state in which tube 16 is non-conductive and tube 17 is conductive.

This new state is however not stable due to discharging of condenser 21, so that the control grid voltage of the tube 16 increases exponentially and approaches asymptotically the value of the voltage E22 (Fig. 3E) at the lower end of resistor 27. This is however, not reached due to the fact that at the moment in which said control grid voltage equals the cut-off voltage of tube 16, a plate current starts flowing in this tube causing the plate voltage to decrease. This causes the control grid voltage of tube 17 to decrease which in turn increases the plate voltage of said tube. The result is that the control grid voltage of tube 16 increases more rapidly than would result otherwise. Thus a cumulative switching action is obtained which terminates the non-stable period and initiates the stable condition anew. This stable condition maintains itself until the next negative pulse arrives at the third grid of tube 16. Said voltage E22 is produced by the plate current of tube 17 as will be readily seen in Fig. 1. In a stable state the said plate current is zero and there will be no grid voltage, the only result of this being that during such period no grid current flows through tube 16.

It is obvious that the pulse duration is determined by the values of condenser 21 and resistor 27 as well as by the ratio between negative voltage excursion at the plate of tube 17 and the voltage across the lower part of resistor 22, namely, temperature responsive resistance 22–B. Said ratio being equal to the ratio between the resistance value of the lower part of resistor 22 and the resistance in the plate circuit of tube 17, the pulse duration will be independent from the plate current of said tube.

Figure 3:
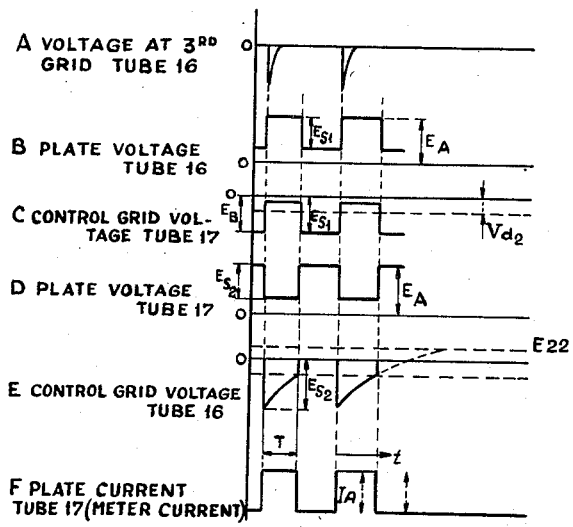
Fig. 3 shows the pulses in the current pulse generator.

Fig. 3 shows the various voltages occurring in this circuit. The plate current of tube 17 (Fig. 3F) will have the shape of virtually rectangular pulses of constant amplitude and duration and with a frequency corresponding to that of the input pulses, the frequency being therefore the frequency to be measured. A D. C. current meter, e. g. of the moving coil type, can thus be inserted in the plate circuit of tube 17, the reading of which is a measure of this frequency. This only applies, however, provided the amplitude and duration of the plate current pulses of tube 17 are sufficiently constant. In order to ensure this in operation, as well as when replacing tube 17 by another one of the same type or when this tube undergoes modifications due to normal wear, certain provisions are made in the circuit.

In order to make the circuit insensitive to such influences, the resistor 22 has been introduced in the cathode lead of tube 17, while the control grid of this tube is connected across a high resistor 23 to a point of constant positive potential, being the plate of a gas-filled voltage reference tube 24, this grid being connected—not direct, but via diode 20—to the point between capacitor 19 and resistor 25, the plate of which diode is connected to the control grid of tube 17.

It is known that such a diode allows only a current flow from plate to cathode and in this case the diode acts as a resistor which, with the current intensities occurring in the present case, is such that the voltage drop across the diode is very small. The anode then has a negligible voltage relatively to the cathode. If, however, the diode plate becomes negative relative to the cathode, the diode acts as an infinitely high resistor.

When at the beginning of the non-stable period the plate voltage of tube 16 increases, the voltage drop across the diode will remain very small as long as the diode passes a current and the plate voltage will increase together with the cathode voltage, by which means the voltage across resistor 23 decreases very rapidly towards zero and becomes zero when the cathode and plate voltages of diode 20 reach the value of the voltage across stabiliser tube 24 relatively to temperature responsive resistance 22–B, and at this instant no more current will flow through resistor 23. The voltage excursion at the anode of tube 16 is so great however that the cathode voltage of diode 20 increases still further, but the plate of this diode will not be able to follow this voltage increase any further as it would cause a current through diode 20 from cathode to plate, which is impossible.

The control grid of tube 17 is connected direct to the plate of diode 20 having therefore the same voltage. The presence of diode 20, resistor 23 and voltage reference tube 24 thus has the result that the control grid of tube 17 closely follows the voltage variations of the connecting point between capacitor 19 and resistor 25 so long as this point has a voltage lower than the voltage across tube 24, whereas if said voltage becomes higher than that across tube 24 the control grid of tube 17 is kept at the constant voltage of the voltage reference tube.

During the non-stable period of the circuit, the control grid voltage of tube 17 will remain constant, provided care is taken that the positive voltage excursion at the anode of tube 16 is so great that during this entire period the voltage in the connecting point between 19 and 25 relatively to temperature responsive resistance 22-B is greater than the voltage of the voltage reference tube and provided no grid current occurs in tube 17, which is ensured by resistor 22 as it has the result that the plate current in tube 17 makes the cathode so strongly positive that the control grid remains slightly negative relatively to the cathode.

As the charging and discharging chains of capacitor 19 in stable and non-stable periods are not identical owing to the conductivity and non-conductivity respectively of diode 20, the mean voltage of the cathode of diode 20 when the device is put into operation will become slightly more negative until a stable state is reached dependent upon the frequency to be measured and this cannot be allowed to happen. To prevent this, a clamping diode 26 is used which ensures that the alternating voltage on the cathode of diode 20 cannot fall below the voltage of the lower end of resistor 25.

The desired temperature correction may be achieved by making the pulse duration, pulse height or both dependent on the temperature of the medium metered. The pulse duration can be controlled by the variations of resistor 31, the pulse height by the variation of the upper part of resistor 22, and both the pulse duration and height can be controlled by variation of temperature responsive resistance 22-B, namely 22-A.

In order to achieve this a suitable part of the resistor in question, e. g. the lower part of resistor 22 may consist of a material having a certain thermal coefficient of resistance and this part is located in the metering device in such a way that it is in close thermal contact with the medium to be metered. If the medium temperature increases the through-flow of medium expressed in weight per unit of time remaining constant, the rate of revolution of the rotor and consequently the frequency to be measured will increase. If said part of resistor 22 consists of a material having a positive thermal coefficient of resistance the resistance value will increase also, and if the size and the material of this part of the resistor are suitably chosen, it will be possible to ensure that the increase in resistance compensates the increase in frequency, as far as the meter indication is concerned.

Stabilization of the pulse amplitude can be further improved by reducing further the dependence of this amplitude upon the feed voltage with the aid of a certain bridge circuit. For this purpose the cathode resistor 22 and the gas-filled voltage reference tube 24 are grounded via resistor 28. Besides this, resistor 23 is not connected direct to the plate of tube 24 but leads to a tap from a voltage divider 29, 30 between the said plate and ground. If, for example, the plate feed voltage increases for any reason, so that the ungrounded end of resistor 28 becomes positive again, the cathode voltage of tube 17 will increase by the same amount as the voltage at the upper end of resistor 28 if it is a priori assumed that the circuit performs its function, that will say that the plate current of tube 17 remains constant indeed. The plate voltage of tube 24 will also increase by this amount. The voltage at the tap between 29 and 30 and also therefore the control grid voltage of tube 17 will increase, but in the proportion $$\frac{R_{30}}{R_{29}+R_{30}}$$

less than the plate voltage of 24 and therefore less than the increase in the cathode voltage of tube 17. The control grid of this tube therefore becomes more negative relatively to the cathode, and counteracts the plate voltage increase.

I claim:

1. A frequency meter suitable for use in combination with a fluid metering device whose output is an alternating voltage the frequency whereof is a function of the velocity of the fluid flowing through said metering device, said frequency meter comprising a bi-stable multivibrator having two tubes provided with a common cathode resistor, the first of said tubes having a positively biased control grid fed by the alternating voltage whose frequency is to be determined, and having a plate grounded through a voltage divider, the tap of said divider being connected to a control grid of second tube, said second tube having a plate grounded through a differentiating circuit consisting of a series R-C-combination to differentiate the rectangular voltage pulses occurring at the plate of said second tube, a diode being positioned across the resistor of said R-C-combination to suppress the positive parts of said pulses, the frequency meter further comprising a mono-stable multivibrator comprising two tubes, the first of which having a third grid connected to said differentiating circuit, a connecting circuit between said first and said second tubes of said mono-stable multivibrator, said circuit comprising in series a capacitor and a diode, said first tube having a plate connected to said capacitor and said second tube having a control grid connected to a plate of said diode, said control grid being further connected through a resistor to a tap of a voltage divider, a voltage reference tube being positioned across said voltage divider, said first tube of said mono-stable multivibrator having a control grid connected through a resistor with a tap of a second resistor positioned in the cathode circuit of said second tube of the mono-stable multivibrator, the lower end of said second resistor being connected with a cathode of said voltage reference tube and being further connected through a third resistor to the ground, the frequency meter further comprising a D. C. current meter positioned in the plate circuit of said second tube of said mono-stable multivibrator.

2. In a direct reading fluid flow meter of the class described and comprising a frequency meter suitable for use in combination with a fluid metering device whose output is an alternating voltage the frequency whereof is a function of the velocity of the fluid flowing through said metering device, said frequency meter comprising a bi-stable multivibrator having two tubes provided with a common cathode resistor, the first of said tubes having a positively biased control grid fed by the alternating voltage whose frequency is to be determined, and having a plate grounded through a voltage divider, the tap of said divider being connected to a control grid of second tube, said second tube having a plate grounded through a differentiating circuit consisting of a series R-C-combination to differentiate the rectangular voltage pulses occurring at the plate of said second tube, a diode being positioned across the resistor of said R-C-combination to suppress the positive parts of said pulses, the frequency meter further comprising a mono-stable multivibrator comprising two tubes, the first of which having a third grid connected to said differentiating circuit, a connecting circuit between said first and said second tubes of said mono-stable multivibrator, said circuit comprising in series a capacitor and a diode, said first tube having a plate connected to said capacitor and said second tube having a control grid connected to a plate of said diode, said control grid being further connected through a resistor to a tap of a voltage divider, a voltage reference tube being positioned across said voltage divider, said first tube of said mono-stable multivibrator having a control grid connected through a resistor with a tap of a second resistor positioned in the cathode circuit of said second tube of the mono-stable multivibrator, the lower end of said second resistor being connected with a cathode of said voltage reference tube and being further connected through a third resistor to the ground, the frequency meter further comprising a D. C. current meter positioned in the plate circuit of said second tube of said mono-stable multivibrator, said flow-meter further comprising a temperature-correcting device, consisting of a resistor having a positive temperature coefficient of resistivity, positioned in close terminal contact with the fluid to be measured, said resistor being at least part of the cathode resistor of the second tube of said mono-stable multivibrator, whereby said temperature correcting device permits a direct reading in weight units of fluid flow.

References Cited in the file of this patent

UNITED STATES PATENTS

| | | |
|---|---|---|
| 2,510,381 | Cushing | June 6, 1950 |
| 2,563,879 | Soukaras | Aug. 14, 1951 |
| 2,623,389 | Oosterom | Dec. 30, 1952 |

OTHER REFERENCES

Cohen, Abstract Ser. No. 665,998, filed April 30, 1946; published January 31, 1950.